United States Patent Office 2,819,175
Patented Jan. 7, 1958

---

2,819,175

NEW CADMIUM SULFIDE YELLOW PIGMENTS

Helmut Flasch, Leverkusen, Germany, assignor to Farbenfabriken Bayer Aktiengesellschaft, Leverkusen, Germany, a corporation of Germany No Drawing. Application July 13, 1955
Serial No. 521,894

Claims priority, application Germany July 15, 1954

2 Claims. (Cl. 106—301)

The present invention relates to new cadmium sulfide yellow pigments and to a process for their production.

The yellow pigments of cadmium sulfide which are available on the market are not useful for outside painting, since their fastness to light and stability to atmospheric influences are unsatisfactory.

In accordance with the invention it has been found that cadmium sulfide yellow pigments of increased fastness to light and very good stability to atmospheric influences are obtained by incorporating with the pigments a small proportion of selenium. Yellow pigments of cadmium sulfide of satisfactory fastness properties are obtainable according to the invention by incorporation of 1% or a lesser quantity of selenium calculated on the cadmium content of the pigments. In most cases, a proportion of 0.2% of selenium calculated on the cadmium content is sufficient to obtain the desired effect. The incorporation of 0.2% to 0.5% of selenium calculated on the cadmium content of the pigment does not involve any color displacement whatever.

The new cadmium sulfide yellow pigments having an excellent fastness to light and very good stability to atmospheric influences are produced for instance by intimately mixing the pigment prepared in the usual manner with the desired amount of selenium in the form of cadmium sulfide selenide, and heating the mixture for some time, e. g. for 30 minutes to two hours, to temperatures of about 500–700° C. The selenium is completely taken up by the pigment. By the incorporation of selenium, the pigment becomes fast to light and resistant to atmospheric influences.

According to a preferred embodiment of the invention selenium, e. g. in form of a sodium sulfide solution containing selenium, is added to the yellow pigment during the manufacture thereof. The effect obtained by the incorporation of a small amount of selenium is presumably due to the fact that the selenium incorporated into the cadmium sulfide lattice exerts a stabilizing action. The invention allows of producing pigments of excellent fastness to light and very good stability to atmospheric influences by subjecting to the herein described treatment either pure cadmium sulfide yellow pigments or pigments mixed with e. g. barium sulfate, zinc oxide, titanium dioxide and lithopone.

The invention is further illustrated by the following example without being restricted thereto.

*Example*

500 liters of cadmium chloride solution containing 390 g. of $CdCl_2$ per liter are mixed at a temperature of 60° C. first with 8 liters of a sodium sulfide selenium solution containing 200 g. of $Na_2S$ and 75 g. of Se per liter and then with 1130 liters of a hot barium sulfate solution containing 160 g. of Ba per liter. The crude pigment is separated by squeezing, dried and calcined at about 600° C. After cooling the pure pigment is ground in a wet condition, squeezed off, washed and dried. 150 kg. of a brilliant, light-resistant and weatherproof yellow cadmium pigment are obtained.

I claim:

1. A light-fast, atmospherically stable yellow pigment essentially consisting of cadmium sulfide having about 0.2 to 1% selenium incorporated in its lattice.

2. Light-fast atmospherically stable yellow pigment according to claim 1 including an extender.

References Cited in the file of this patent

UNITED STATES PATENTS

| | | |
|---|---|---|
| 1,894,931 | O'Brien | Jan. 17, 1933 |
| 2,515,721 | Marcot | July 18, 1950 |

FOREIGN PATENTS

| | | |
|---|---|---|
| 604,226 | Germany | Oct. 17, 1934 |